(12) United States Patent
Foege

(10) Patent No.: US 7,347,002 B2
(45) Date of Patent: Mar. 25, 2008

(54) BARREL MEASURING DEVICE

(76) Inventor: Robert Foege, 31 Shepard Hill Rd., Newtown, CT (US) 06470

( * ) Notice: Subject to any disclaimer, the term of this patent is extended or adjusted under 35 U.S.C. 154(b) by 0 days.

(21) Appl. No.: 11/529,630

(22) Filed: Sep. 28, 2006

(65) Prior Publication Data

US 2007/0089315 A1     Apr. 26, 2007

Related U.S. Application Data

(60) Provisional application No. 60/723,416, filed on Oct. 5, 2005.

(51) Int. Cl.
*G01B 5/00*     (2006.01)
(52) U.S. Cl. .......................................... 33/783; 33/542
(58) Field of Classification Search .......... 33/786–784, 33/792, 794, 796, 609–610, 810–811, 813, 33/827, 832, 783, 800–801
See application file for complete search history.

(56) References Cited

U.S. PATENT DOCUMENTS

| | | | |
|---|---|---|---|
| 2,312,222 A | 2/1943 | Tanner | |
| 2,502,613 A | 4/1950 | Zanolio | |
| 4,348,812 A | 9/1982 | Middleton | |
| 5,483,751 A * | 1/1996 | Kodato | ........................ 33/794 |
| 5,570,513 A | 11/1996 | Peterson | |
| 5,604,989 A | 2/1997 | Stevenson | |
| 6,604,289 B2 * | 8/2003 | Nikolov | ................... 33/27.032 |
| 6,766,583 B2 | 7/2004 | Economaki | |
| 6,957,498 B2 | 10/2005 | Tsai | |

* cited by examiner

*Primary Examiner*—Yaritza Guadalupe-McCall
(74) *Attorney, Agent, or Firm*—Mark E. Pochal, Esq.

(57) ABSTRACT

A barrel measuring device for accurate measurement of all internal dimensions and barrel wall thickness of a gun, tube, pipe or cylinder is comprised of a fixed probe transversely attached to a cross member at a distal end. A second probe transversely attached to a body member proximate to the fixed probe, said body member and second probe slidaby moveable along the axis of the cross member. A measurement device attached to the body member and second probe for recording of the diameter proportional to the degree of expansion of the fixed and second probe within the barrel. A recoil means for expansion contained with the cross member and attached to the body member coupled with the second probe providing an expansion pressure between the probes for measurement with the measuring device.

12 Claims, 2 Drawing Sheets

BARREL MEASURING DEVICE

This application claims benefit of provisional application Ser. No. 60/723,416, filed Oct. 5, 2005.

TECHNICAL FIELD

The present invention relates to devices for measuring the internal barrel dimensions and barrel wall thickness of a gun, tube, pipe or cylinder.

BACKGROUND OF THE INVENTION

A gun barrel's critical dimensions, although there are corresponding standard internal diameters depending on gauge numbers, differ in actual internal diameter depending on the manufacturer. The critical dimensions of the gun barrel are: the bore; choke; chamber length and diameter, forcing cone length and barrel wall thickness. These dimensions are important to know by the gun user for safety reasons and their effect on performance and accuracy of the gun. Specifically, the chamber length is important to use the ammunition for which it was intended. Knowing the dimensions of the choke is critical for the game or target on hand as the choke of a gun, or the decrease in diameter of the bore near the end of the barrel, controls the shot pattern. It is critical to know the amount of wear and degree of useful life of a barrel for safety reasons determined by the barrel wall thickness. Likewise, by knowing these critical dimensions, the user can determine if the chokes on a gun have been altered from the barrel markings, or if the barrels are original or after market or have been overbored, or if the chamber has been altered or reproofed.

Inventions have been made for measuring the internal diameter of a gun barrel. U.S. Pat. No. 4,348,812 describes an elongated tool inserted into a gun barrel having blades that expand outward when a rod member is slide forward. The blades engage with the inner surface of the gun barrel and the diameter is read from the indicia on the rod. Also, a set point member can be locked on the indicia marking and the user removes the tool from the gun barrel by retracting the rod to cause the blades to move back together. Then the arms are reset outside the gun using the set point position and the diameter may be measured with a micrometer.

Other inventions utilize a scissors mechanism which expand when inserted in a gun barrel and then withdrawn and the degree of expansion is measured using a micrometer.

Another use of the preferred embodiment of the present invention is for use in measuring bore diameters in any tube, pipe or cylinder used in an industrial application.

There is a continuing need for a relatively inexpensive device in which the measuring probes are expanded by a spring force eliminating any human intervention and the diameter of expansion measured while engaged within the barrel without the need to use a micrometer.

There is also a continuing need to provide a device that can easily and quickly be recalibrated to ensure repeatable accurate readings.

SUMMARY OF THE INVENTION

It is an object of the present invention to provide a spring loaded probe to provide exact pressure against a gun barrel or other pipe, cylinder or tube, inner surface in use, assuring accuracy and repeatability in measurement.

It is a further object of the invention to provide a spring loaded probe for removal of all personal factors in the measuring process providing greater accuracy and reliability.

It is a further object of the present invention to provide a spring loaded probe causing pressure to expand the probes into the measuring surface without interference with the user's hands.

It is a further object of the present invention to provide a scissors action of the probes allowing measurement of bores as small as 0.390".

It is a further object of the present invention to provide a digital display in metric and inches for recording of measurements.

It is a further object of the present invention is to provide a means for measuring a gun barrels wall thickness and other tube, pipe or cylinder wall thickness.

It is a further object of the present invention to provide a device that is convenient, accurate, and easy to operate at an affordable price capable of measuring bores from 0.410 to 4 gauges and measuring chamber lengths at the same time.

It is a further object of the present invention to provide a light, convenient device for carrying into the field or shooting venue and easily and quickly take the desired measurements.

It is a further object of the present invention to provide a means for easy recalibration of the device assuring extreme accuracy.

In accord with the invention, a fixed probe is transversely attached to a distal end of a cross member. A second probe, proximate to the first probe, is transversely attached to a body member affixed to the cross member and slideable along the cross member axis. A measuring device attached to the body member and second probe activated by opening of the second probe measuring the diameter proportional to the degree of expansion between the first and second probe.

In further accord with the invention, a recoil mechanism is positioned within a recessed channel in the cross member. The recoil mechanism is further attached to the body member causing an expansion force pulling the second probe apart from the fixed probe. A stop pin positioned on the axis of cross member at a predetermined distance limits the degree of expansion.

When engaged within a gun barrel the probes expand the diameter of the gun barrel by means of the recoil mechanism providing accurate and repeatable measurement of the barrel dimensions.

In further accord with the invention, the probes have measurement indicia contained thereon for measurement of the barrel length dimensions, measured while inserted in the gun barrel.

In further accord with the invention, in a preferred embodiment, the probes have at least one bead positioned at a distal end of said probes for biasing against the gun barrel inner wall surfaces during engagement for accurate measurement readings.

The foregoing and other objects, features and advantages of the present invention will become more apparent from the following description of preferred embodiments and accompanying drawings.

DESCRIPTION

Figure 1:
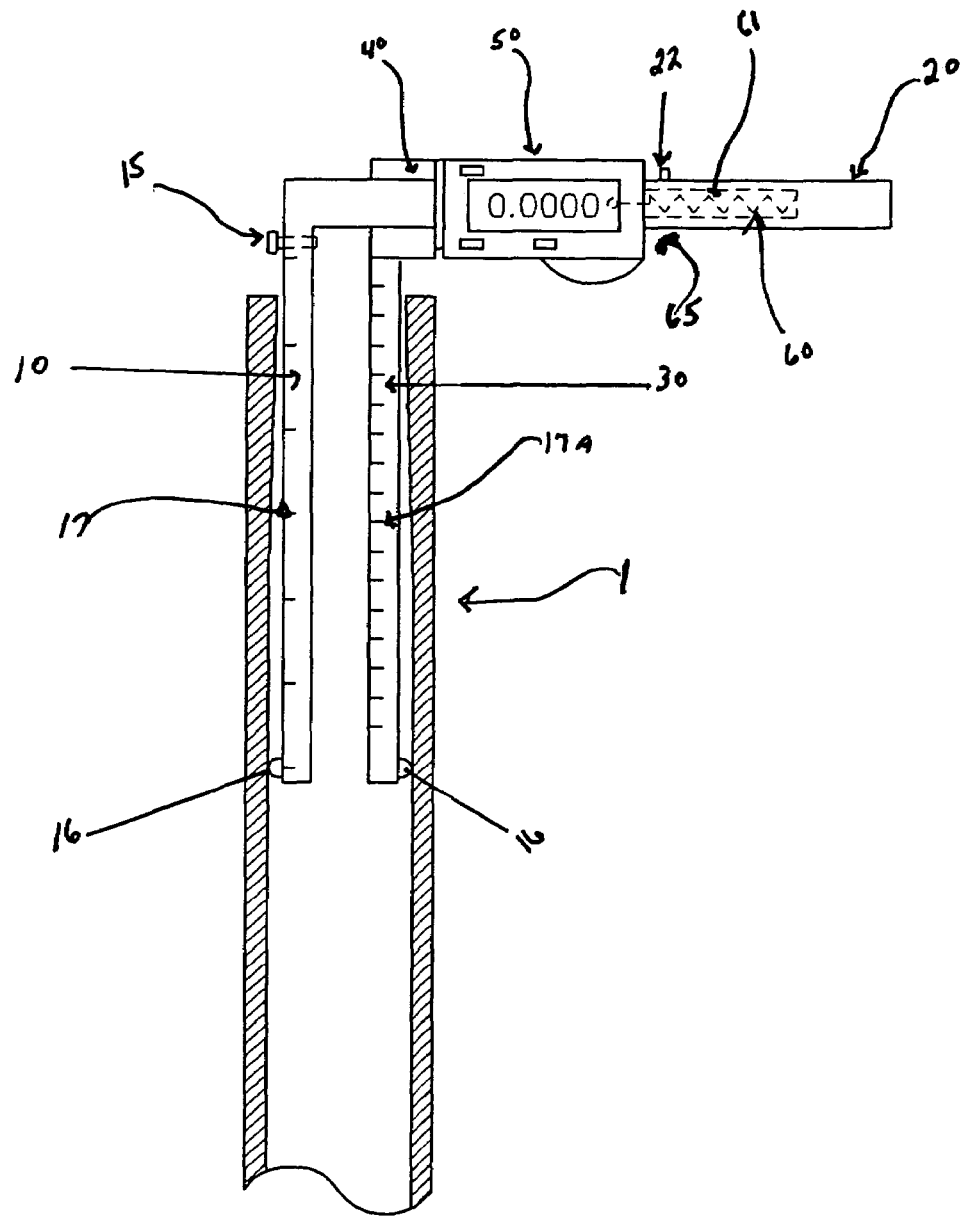
FIG. 1 is a view of the measuring device engaged within a gun barrel.

As schematically illustrated in FIG. (1) in measuring bore dimension of a gun barrel (1), a fixed first probe (10) is transversely affixed to a distal end of cross member (20). A second probe (30) is transversely affixed to a body member (40). The body member (40) is positioned on cross member (20) and is slidable along the axis of cross member (20) to a stop pin (22) positioned at a predetermined length along cross member (20). Measuring device (50) is coupled to body member (40) and second probe (30) and is activated by expansion of second probe (30) measuring the diameter proportional to the degree of expansion away from first probe (10). Calibration screw (15) is positioned through the first probe (10) to insure accuracy of the measurements at a zero measurement position.

In a preferred embodiment, measuring device (50) is a digital display capable of measuring in inches or millimeters and contains a zero function. Prior to engagement into a gun barrel (1) for measurements, the second probe (30) is pushed together with the first probe (10) to the maximum left position. Measurement device (50) is set to zero. The first and second probe (10,30) are inserted into the gun barrel (1) and released causing the second probe (30) to expand by means of the recoil mechanism (65) until beads (16) positioned on the distal end of the first and second probe(10, 30) are biased against the gun barrel interal walls. The diameter of expansion of the probes (10, 30) is recorded on the measuring device (50). The length of a barrel chamber is measured by reading the measurement indicia (17,17*a*) contained on the probes. (10, 30). In a preferred embodiment of the invention, the measurement indicia (17) on the first probe (10) is in inches. In a preferred embodiment, the measurement indicia (17*a*) contained on the second probe (30) is in millimeters. Measurements of other gun barrel dimensions such as the choke, and forcing cone are similiarly performed by insertion of the device at appropriate positions in gun barrel (1)

The recoil means, in a preferred embodiment, illustrated in FIG. (1), comprises a spring (61), recessed within a channel (60) in the cross member (20). The spring is further attached to the body member (40) at a position creating an exertion force pulling the second probe (30) apart from first probe (10). The degree of expansion of the second probe and body member is limited by stop pin (22).

Figure 3:
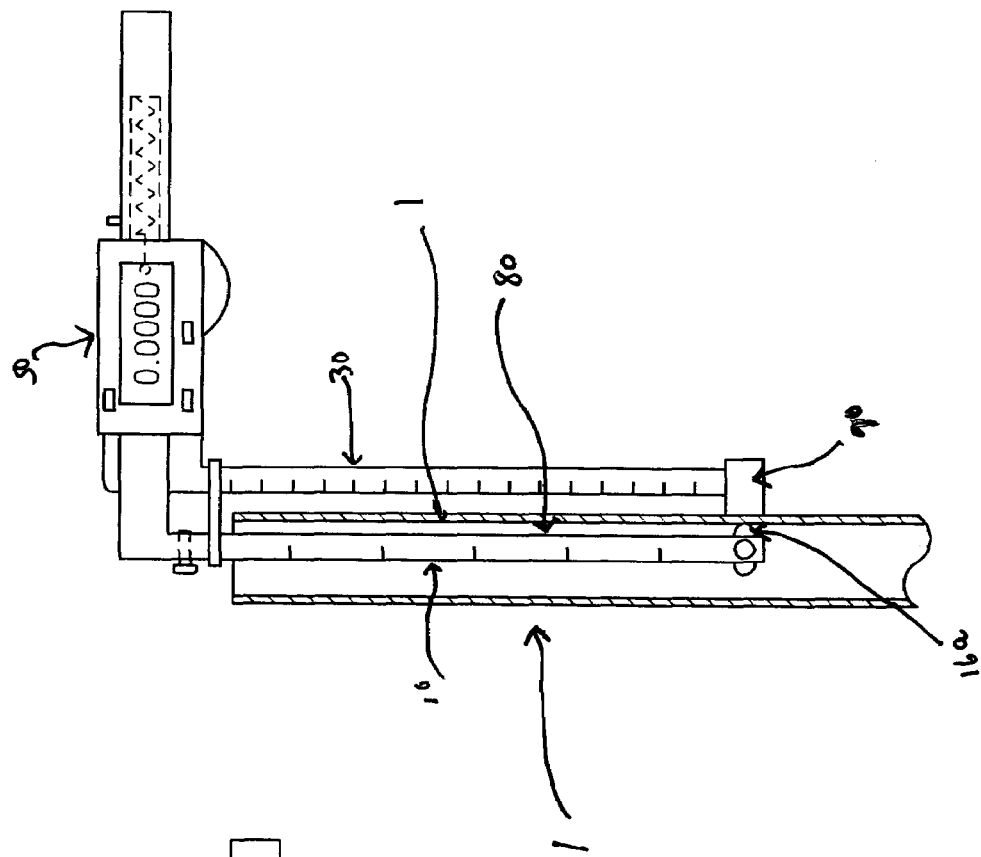
FIG. 3 is a view of the gun measuring device engaged within a gun barrel for measuring barrel wall thickness.
Figure 2:
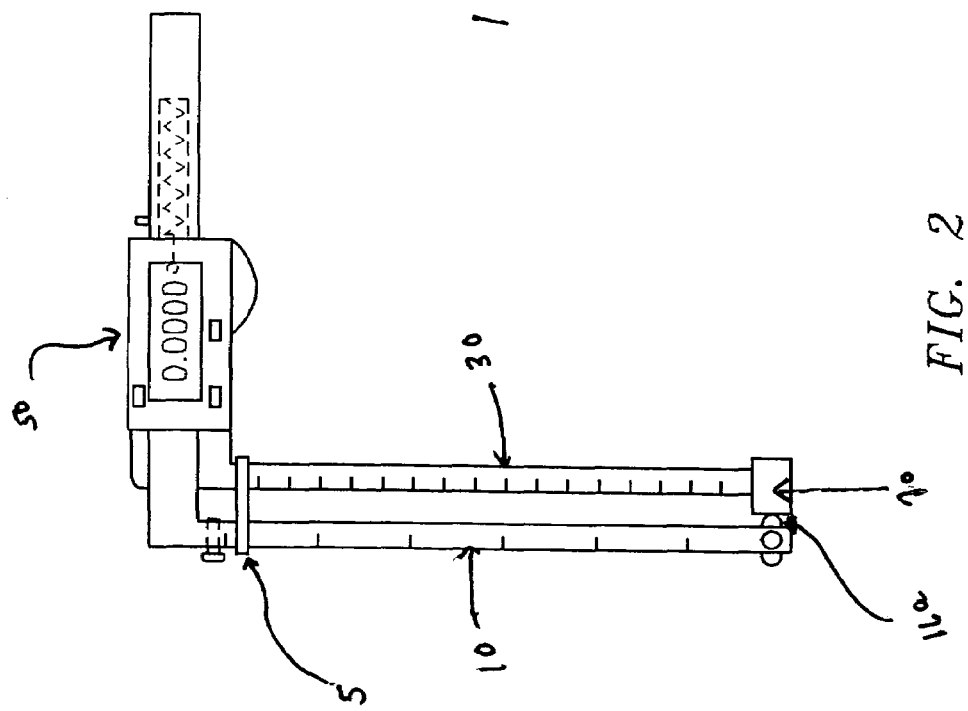
FIG. 2 is an isolated view of the gun measuring device configured to measure a gun barrel wall thickness.

As schematically illustrated in FIG. 2 and FIG. 3, the gun measuring device is configured for measuring gun barrel wall thickness (80). A generally square fitting (70) is snapped into position on the distal end of second probe (30). A second bead (16*a*) is positioned on an inner surface of first probe (10).

A o-ring (5) is positioned around first and second probe (10,30) maintaining a closed position in which a bead(16*a*) on the inner side of first probe(10) and square fitting (70) are in contact. Measurement device (50) is set to zero.

As schematically illustrated in FIG. 3, first probe (10) and second probe (30) are inserted between gun barrel wall (1). Probes (10, 30) are expanded by the degree of thickness of gun barrel wall (80). Measurement device (50) records the diameter proportional to the degree of expansion.

Although this invention has been shown and described with respect to some embodiments, it will be understood by those skilled in this art that various changes in form and detail thereof may be made without departing from the spirit and scope of the claimed invention.

What is claimed is:

1. A caliper device for measuring a barrel internal diameter and a barrel length comprising:
   a barrel member having an opening and a first and second internal wall surface;
   a first fixed probe transversely appended to a distal end of a cross member;
   a second probe, proximate to the first probe, affixed to a body member appended to the cross member, said second probe and body member slidable along the cross member axis, said first and second probe inserted in communication into said barrel member opening;
   a first measuring device affixed to the body member, said measuring device activated by opening of said second probe engaged within said barrel member measuring the barrel internal diameter proportional to the degree of expansion of the first and second probes, a second measuring means contained thereon the first and second probes; and,
   a recoil means contained within the cross member attached to the body member for expansion of said probes biased against the first and second internal wall surface.

2. The caliper device of claim 1, wherein the first probe has measuring indicia contained thereon.

3. The caliper device of claim 2, wherein the first probe has measuring indicia in inches.

4. The caliper device of claim 1, wherein the distal end of the cross member at the position of the first probe contains a calibration screw.

5. The caliper device of claim 1, wherein the measuring device contains a digital display capable of measuring in inches or millimeters.

6. The caliper device of claim 1, wherein the second probe contains measuring indicia thereon.

7. The caliper device of claim 1, wherein the second probe contains measuring indicia in metric.

8. The caliper device of claim 1, wherein the recoil means comprises: a spring secured within a channel in the cross member, said spring further attached to the body member providing an expansive force between the probes.

9. The caliper device of claim 1, wherein the cross member contains a stop pin to limit movement of the body member along the axis of said cross member.

10. The caliper device of claim 1, wherein the first and second probes have at least one bead on an outer side of said probes at a distal position from the cross member for biasing said probe against the first and second internal walls during engagement.

11. A caliper device for measuring a barrel wall thickness comprising:
    a first fixed probe transversely appended to a distal end of a cross member;
    a second probe, proximate to the first probe affixed to a body member appended to the cross member, said second probe and body member slidable along the axis of said cross member;
    a measuring device affixed to the body member, said measuring device activated by opening of said second probe measuring the diameter proportional to the degree of expansion of the probes;
    an o-ring positioned around said first and second probes to maintain a closed position; and,
    a square tip fitting removeably positioned on a distal end of the second probe causing expansion of the second probe from contact with a outer surface of the barrel wall with the first probe biased against an inner surface of said barrel wall.

12. The caliper device for measuring barrel wall thickness of claim 11, wherein the first probe contains a bead positioned on a inner surface of a distal end of said first probe for biasing against the inner surface of the barrel wall during engagement.

* * * * *